(12) United States Patent
Toler

(10) Patent No.: US 11,635,523 B2
(45) Date of Patent: Apr. 25, 2023

(54) AIRCRAFT LASER COLLISION DETECTION SYSTEM

(71) Applicant: Gulfstream Aerospace Corporation, Savannah, GA (US)

(72) Inventor: Brian Toler, Savannah, GA (US)

(73) Assignee: Gulfstream Aerospace Corporation, Savannah, GA (US)

( * ) Notice: Subject to any disclaimer, the term of this patent is extended or adjusted under 35 U.S.C. 154(b) by 352 days.

(21) Appl. No.: 16/948,715

(22) Filed: Sep. 29, 2020

(65) Prior Publication Data

US 2022/0099840 A1  Mar. 31, 2022

(51) Int. Cl.
| | |
|---|---|
| *G01S 17/933* | (2020.01) |
| *G01S 7/51* | (2006.01) |
| *G01S 17/58* | (2006.01) |
| *G08G 5/00* | (2006.01) |
| *G08G 5/04* | (2006.01) |

(52) U.S. Cl.
CPC .............. *G01S 17/933* (2013.01); *G01S 7/51* (2013.01); *G01S 17/58* (2013.01); *G08G 5/0078* (2013.01); *G08G 5/04* (2013.01)

(58) Field of Classification Search
CPC .................................................... G01S 17/933
See application file for complete search history.

(56) References Cited

U.S. PATENT DOCUMENTS

| | | | | |
|---|---|---|---|---|
| 9,207,319 | B2 * | 12/2015 | Starr | ........................ G01S 13/93 |
| 10,782,694 | B2 * | 9/2020 | Zhang | ..................... G08G 1/167 |
| 10,838,068 | B2 * | 11/2020 | Lukoschat | ............. B64D 45/00 |
| 2005/0007257 | A1 * | 1/2005 | Rast | ..................... G02B 27/017 |
| | | | | 340/815.45 |
| 2019/0137628 | A1 | 5/2019 | Lukoschat et al. | |
| 2022/0099840 | A1 * | 3/2022 | Toler | ...................... G08G 5/065 |

* cited by examiner

*Primary Examiner* — Michael A Berns
(74) *Attorney, Agent, or Firm* — LKGlobal | Lorenz & Kopf, LLP

(57) ABSTRACT

Aircraft anti-collision systems, anti-collision methods, and aircraft with anti-collision systems and methods are provided. A method including transmitting, by a light emitter, a first light pulse proximate to a wing edge at a first time, detecting, by a light detector, a reflection of the first light pulse at a second time, determining, by a processor, a distance from a first object to the wing edge in response to the first time and the second time, calculating, by the processor, a possible contact occurrence in response to the distance and an aircraft velocity, and controlling a user interface with the processor to generate a user alert in response to the possible contact occurrence.

20 Claims, 5 Drawing Sheets

AIRCRAFT LASER COLLISION DETECTION SYSTEM

TECHNICAL FIELD

The technical field relates generally to anti-collision systems for ground based aircraft, and more particularly relates to aircraft sensors, aircraft sensor systems, detectors and detection algorithms, and aircraft equipped with electrically powered detection systems to provide supplemental proximate object sensing.

BACKGROUND

Private aircraft tend to spend a lot of time on the ground and may not have the level of ground support enjoyed by larger commercial aircraft. Pilots of these smaller aircraft often must maneuver these aircraft around other aircraft and other obstacles on the ground such as when the aircraft is taxiing, being maneuvered to or from a hangar, or backing an aircraft away from a terminal. These obstacles on the ground may be in the path of the aircraft and may not be static obstacles, such as buildings, but movable objects which the aircraft may clear multiple times, but not have sufficient space after an object has been moved.

Often crew within the cockpit of an aircraft do not have a clear view of the forward and rearward edges of the wings on the aircraft. Surrounding obstacles and other aircraft are commonly detected by the crew using sight. It can be difficult for an operator to monitor extremes of the aircraft during ground operations due to the dimensions of the aircraft, such as large wing sweep angles, distance from cockpit to wingtip, etc., and the operator's limited field of view of the areas surrounding the aircraft. As a result, the operator may fail to detect obstacles that are located in "blind spots" in close proximity to the aircraft. In many cases, the operator may only detect an obstacle when it is too late to take evasive action needed to prevent a collision with an obstacle.

Collisions with an obstacle can not only damage the aircraft but can also put the aircraft out of service and result in flight cancellations. The costs associated with the repair and grounding of an aircraft are significant. As such, it is desirable to provide timely detection of surrounding obstacles that lie in the ground path of a vehicle such that the obstacles may be avoided. As such, it is desirable to provide aircraft sensor systems, sensor algorithms, and aircraft that provide convenient and improved proximate object detection and anti-collision systems. In addition, other desirable features and characteristics will become apparent from the subsequent summary and detailed description, and the appended claims, taken in conjunction with the accompanying drawings and this background.

The above information disclosed in this background section is only for enhancement of understanding of the background of the invention and therefore it may contain information that does not form the prior art that is already known in this country to a person of ordinary skill in the art.

SUMMARY

Disclosed herein are aircraft sensor systems, sensor algorithms, and aircraft that provide convenient and improved proximate object detection and anti-collision systems, aircraft and related control logic for provisioning aircraft, methods for making and methods for operating such systems, and other vehicles equipped with onboard control systems. By way of example, and not limitation, there is presented a laser based anti-collision system for detecting possible aircraft collisions and providing audible and visual warnings to aircraft crew when a potential collision is detected. In a first non-limiting embodiment, a collision detection system within an aircraft, the collision detection system including a first light emitter adapted to be mounted to the aircraft, the first light emitter being configured for transmitting a first light pulse at a first distance to a wing edge and providing a first time indicative of the transmitting of the light pulse, a first light detector, adapted to be mounted to the aircraft, the first light detector being configured to detect a reflection of the first light pulse and to provide a second time indicative of the detection of the reflection of the light pulse, a processor adapted to be mounted to the aircraft and configured to receive the first time and the second time, to determine a possible contact occurrence between the first object and the wing edge based, at least in part, on the first time and the second time, and to generate a first control signal in response to determining the possible contact occurrence, and a user interface, adapted to be mounted to the aircraft and configured to obtain the first control signal from the processor and to provide a user alert in response to the control signal.

In accordance with another aspect of the present disclosure, a method for transmitting, by a light emitter, a first light pulse proximate to a wing edge at a first time, detecting, by a light detector, a reflection of the first light pulse at a second time, determining, by a processor, a distance from a first object to the wing edge in response to the first time and the second time, calculating, by the processor, a possible contact occurrence in response to the distance and an aircraft velocity, and controlling a user interface with the processor to generate a user alert in response to the possible contact occurrence.

In accordance with another aspect of the present disclosure, an anti-collision system for an aircraft, including a first light emitter, located on an aircraft fuselage, configured for transmitting a first light pulse at a first distance from a wing edge, a second light emitter, located on the aircraft fuselage, configured for transmitting a second light pulse at a second distance from the wing edge wherein the first distance is greater than the second distance, a detector for detecting a reflection of the first light pulse and a reflection of the second light pulse, and a processor configured to generate a first user alert in response to a propagation time of the first light pulse being indicative of a detection of a first object at the first distance to the wing edge and being within a path of the wing edge, the processor being further configured to generate a second user alert in response to a propagation time of the second light pulse being indicative of a detection of the first object at the second distance to the wing edge and being within the path of the wing edge.

The above advantage and other advantages and features of the present disclosure will be apparent from the following detailed description of the preferred embodiments when taken in connection with the accompanying drawings.

BRIEF DESCRIPTION OF DRAWINGS

The above-mentioned and other features and advantages of this invention, and the manner of attaining them, will become more apparent and the system and method will be better understood by reference to the following description of embodiments of the invention taken in conjunction with the accompanying drawings.

The exemplifications set out herein illustrate preferred embodiments of the disclosure, and such exemplifications are not to be construed as limiting the scope of the disclosure in any manner.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various non-limiting embodiments of aircraft sensor systems, aircraft sensor algorithms, and aircraft are provided. In general, the disclosure herein describes a system and method for providing augmented anti-collision systems and object detection systems and methods to aid aircraft operators in avoiding potential contact occurrences while operating ground-based aircraft.

Figure 1A:
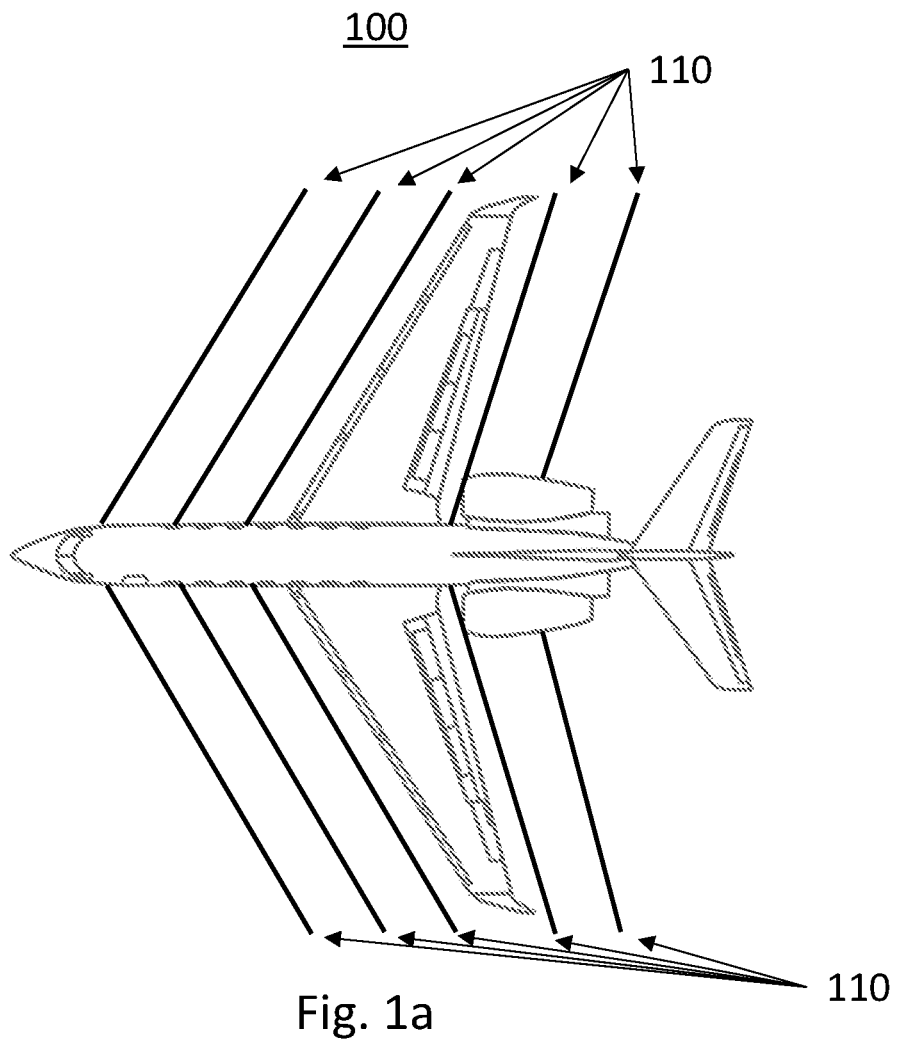
FIG. 1A is illustrative of a top view of an aircraft employing an exemplary embodiment of the aircraft laser anti-collision in accordance with the teachings of the present disclosure.

Turning now to FIG. 1A, a top view of an aircraft 100 employing an exemplary aircraft laser anti-collision system in accordance with an embodiment of the present disclosure is shown. The exemplary aircraft is equipped with a plurality of fixed position laser emitters and detectors. In this example, the lasers are emitted in directions parallel to the leading and trailing edges of the wings. The lasers may be pulsed or may be frequency swept over a frequency band. When an object is present proximate to the aircraft and breaks the path of one or more of the emitted lasers, the detector is configured to detect the change in propagation time of the laser emission and a control signal is generated to be coupled to a user interface to generate a warning signal indicative of an object within the path of the aircraft wing.

In the illustrated exemplary embodiment, the aircraft 100 is equipped with a plurality of laser emitters each emitting a laser beam 110 or a series of light pulses in a fixed direction. Each of the plurality of laser beams 110 is positioned such that they are parallel to either the leading edge of the wing for emitters located forward of the wing, or parallel to the trailing edge of the wing for emitters located aft of the wing. Each of the emitters may be spaced an equal distance along the fuselage such that a regular spacing is maintained between the laser beams 110. The exemplary system may then provide feedback indicative of escalated alerts to an aircraft crew indicative of the proximity of an object to an edge of the wing in response to which of the laser beams 110 is broken by the object. For example, a visual warning way be provided if a first laser beam 110 farthest away from the wing edge is interrupted by an object. Should a laser beam 110 closest to the wing edge be interrupted, a visual and audible alert may be provided to the aircraft crew.

In another exemplary embodiment, the laser emitter and/or detector may be mounted to the aircraft fuselage or built into one of, some of, or all of the over-wing emergency egress lights on both the left and rights sides of the aircraft fuselage. In this example, a first laser may be pointed 2-5 feet forward of the wing and wing tip, a second laser may be point directly at the wing tip for calibration and a third laser may point 2-5 feet behind wing and wing tip. Each laser would be coupled with a detector that would estimate a distance to objects within the laser beam, estimate possible collisions and relay information to the flight deck with visual and audible alerts. In an additional embodiment, the possible collision information and alerts may be related to an attached aircraft towing vehicle when a customer, fixed base operator (FBO), or service center are moving the aircraft.

Figure 1B:
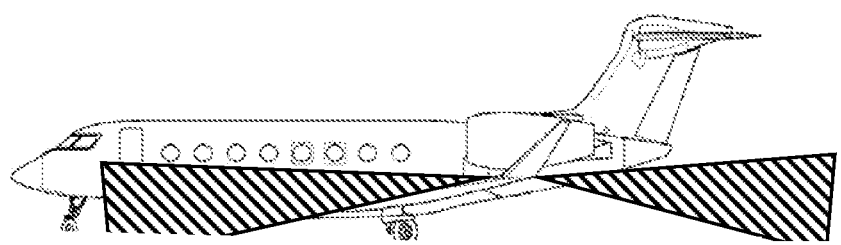
FIG. 1B is illustrative of a side view of an aircraft employing an exemplary embodiment of the aircraft laser anti-collision in accordance with the teachings of the present disclosure.

Turning now to FIG. 1B, a side view of an aircraft 150 employing another exemplary embodiment of the aircraft laser anti-collision in accordance with an embodiment of the present disclosure is shown. In this embodiment, the aircraft 150 may be equipped with a scanning laser emitter and detector located in a wing edge or winglet. In this configuration, a single laser emitter may be used to scan a plurality of angles in elevation, azimuth, or a combination of both. The exemplary aircraft 150 is shown with a scanning laser and detector at a leading wing edge and a trailing wing edge. The exemplary scanning laser is configured to cover a desired scan area at least as large as the wing profile at one or more distances from the wing edge.

In this configuration, a laser pulse is transmitted by the emitter at a known elevation and azimuth and a distance to an object determined in response to a timing of a reflection received at an associated detector. The emitter is then electronically or mechanically realigned to another elevation and/or azimuth, a laser pulse is emitted, and the associated detector is then used to determine an object distance at that elevation and azimuth. The process is repeated at periodic intervals of azimuth and elevation until a desired area is covered and the processor is then repeated to rescan the desired area. The finer the intervals of azimuth and elevation, the higher the resolution of detection points. However, the finer the intervals of azimuth and elevation, the longer the time interval to scan the desired area.

In this exemplary embodiment, the system may determine a distance to an object from the edge of an aircraft wing and provide escalating warnings to an aircraft crew as the distance decreases. In another embodiment, the warnings may only be provided if the aircraft 150 is moving in a direction towards the object. Thus, proximate objects in the opposite direction of movement may not trigger a warning or may not trigger an escalated warning to the aircraft crew.

Figure 2:
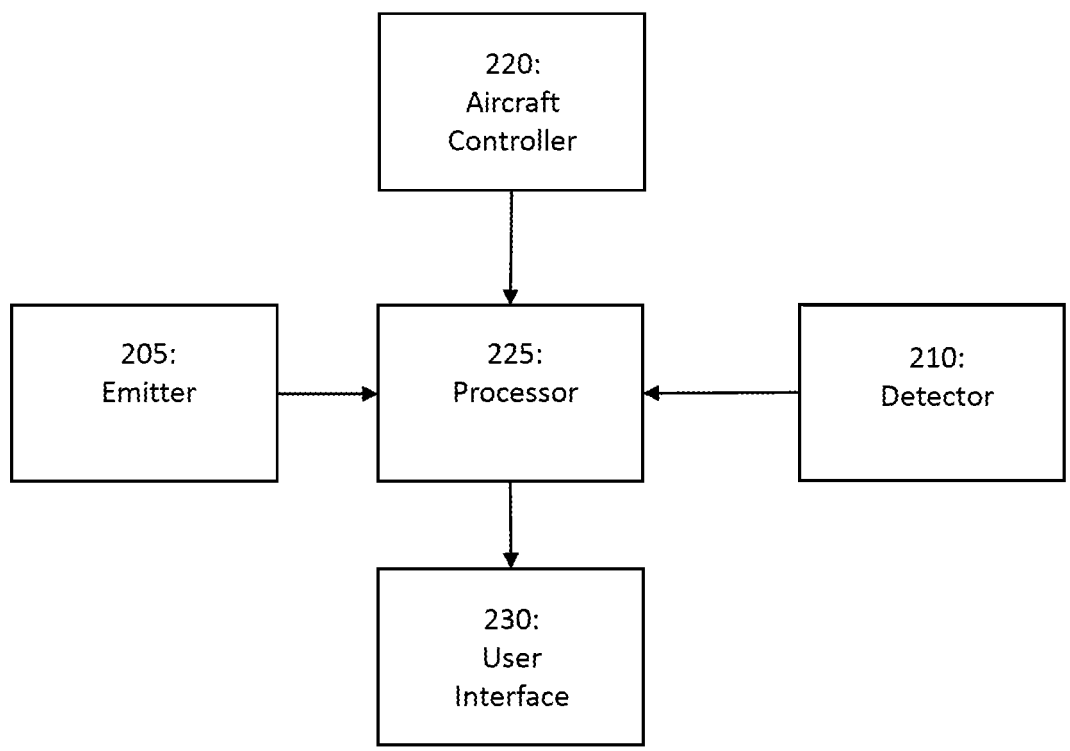
FIG. 2 is a simplified block diagram illustrating a non-limiting embodiment of a system implementing a method for aircraft anti-collision laser system in accordance with the present disclosure.

Turning now to FIG. 2, a block diagram illustrative of an exemplary aircraft system 200 for implementing the method for aircraft anti-collision laser system in accordance with the teachings of the present disclosure is shown. The exemplary aircraft system 200 includes a laser emitter 205, a detector 210, an aircraft controller 220, a processor 225 and a user interface 230.

The laser emitter 205 is configured to transmit an emission, such as a laser pulse, frequency swept laser beam, or other detectable light energy in a known direction. The known direction may include a known azimuth and a known elevation with respect to the aircraft position and orientation. In another embodiment, the emitter 205 may be mechanically or electronically scanned over a field of view. In one embodiment, the emitter 205 may couple an indication of the time of transmission to the processor 225 for determining a distance to objects within the emitters 205 field of view.

The detector 210 may be collated with the emitter 205 or may be located separately with a field of view covering the field of view of the emitter 205. The detector 210 may be configured to detect a reflection of the light emitted by the emitter 205. The detector 210 may include a filter to filter light other than the frequency of light transmitted by the emitter 205. The detector 210 may be further configured to couple an indication of the reception of the light to the processor 225 such that the processor may determine a distance to an object. Alternatively, the detector 210 may be configured to receive a signal from the emitter 205 indicative of the transmission of the light, may detect a reflection of the light from an object within a field of view and may calculate the distance to the object in response to the propagation time of the light reflected from the object. The detector 210, or associated circuitry, may then couple this distance to the processor 225.

The exemplary system may further include an aircraft controller 220 for providing information related to aircraft operations. For example, the aircraft controller 220 may provide a direction, orientation, and/or speed of movement of the aircraft on the ground. In addition, the aircraft controller 220 may provide an indication of the aircraft being on the ground, taxiing, being coupled to a TUG, and/or having landing gear deployed. The aircraft controller 220 may indicate that the aircraft laser anti-collision system is activated in response to a user indication from a user interface, or in response to another aircraft algorithm. In one exemplary embodiment, the aircraft controller 220 may provide an indication of landing gear being deployed, an aircraft taxiing on the ground, and a direction and velocity of the taxiing. The processor 225 may then activate one or more emitters 205 and detectors 210 in response to the information received from the aircraft controller 220, such as only activating emitters 205 ahead of an aircraft wing while an aircraft is travelling forward and not activating emitters behind an aircraft wing when the aircraft is travelling forward. Likewise, emitters may be activated behind the aircraft wing when the aircraft is travelling rearwards.

The processor 225 may be a digital signal processor, a microprocessor or microcontroller, or may be a collection of discrete components configured as a processor 225. The processor 225 may be configured to receive time of transmission from the emitter 205 and time of detection from the detector 210 and to determine a distance to an object in the path of the light pulse. Alternatively, the processor 225 may receive the distance information, or time of propagation, from the emitter 205 and detector 210 circuitry. The processor 225 may then determine if the distance to the object is within the wingspan of the aircraft and may then be a potential collision hazard for the aircraft. In addition, the processor 225 may be configured to calculate a time to impact in response to velocity data received from the aircraft controller and information received from one or more detectors 210. In an exemplary embodiment, the processor 225 may perform this collision determination for one or more emitter 205/detector 210 pairs around the aircraft. If an emitter 205/detector 210 pair has scanning capabilities, the processor 225 may perform this collision determination for each of the azimuth and elevation detections of the emitter 205/detector 210 pair.

If the processor 225 determines a potential collision hazard, the processor 225 may then be configured to transmit an alert or other control signal to a user interface 230 to provide a user alert indicative of the potential collision hazard. The user interface 230 may be a speaker or the like for providing an audible alert, a light or lamp for providing an optical alert, or a display, such as an LCD display or providing an optical, graphical or text alert. The alert may be provided by one or more of the user interface embodiments. In addition, the processor 225 may be configured to detect an object in a first location and provide a first alert via the user interface 225, such as illuminating a lamp, and then provide a second alert via the user interface 225, such as an audio alert, when an object is detected in a second location closer to the aircraft, or in response to an aircraft velocity and an object location being indicative of an imminent collision.

Figure 3:
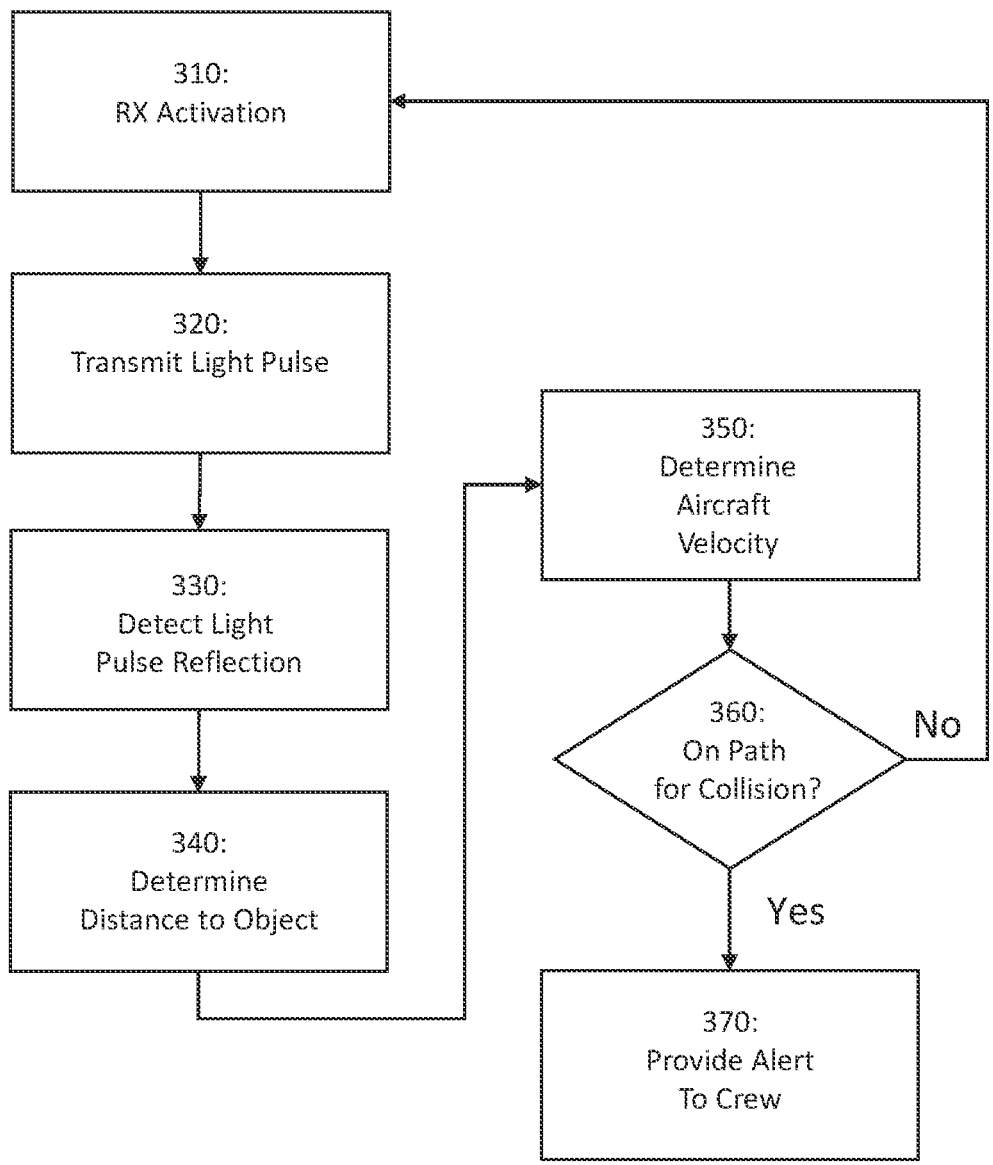
FIG. 3 shows a flow diagram illustrating a non-limiting embodiment of a method for performing a method of aircraft laser anti-collision in accordance with the teachings of the present disclosure.

Turning now to FIG. 3, a flow diagram illustrating a non-limiting embodiment of a method 300 of aircraft laser anti-collision in accordance with the teachings of the present disclosure is shown. The method is first operative to receive 310 an activation of the aircraft laser anti-collision system. The activation may be received in response to a user input, such as an activation by a crew member via a user interface. Alternatively, the activation may be triggered in response to a deployment of landing gear and/or an indication of the aircraft taxiing on the ground.

In response to the activation, the method is next configured to transmit 320 a light pulse via an emitter. In one exemplary embodiment, the light pulse is transmitted parallel to an edge of an aircraft wing. The light pulse may be transmitted by the emitter forward and/or behind the wing. In one configuration, multiple light pulses may be transmitted by multiple emitters such that the light pulses are transmitted along paths at different distances from the aircraft wing.

One or more detectors may be used to detect 330 reflections of the transmitted light pulses. The detectors may be collated with the emitters, or more be located and oriented such that the field of view of the detectors overlaps the field of view of the transmitter. The method may next determine 340 a distance to an object in response to a propagation time of the light pulse. The method may determine the distance to an object within line of sight of the emitter by measuring the time from the emission of the light pulse to the time of detection of the reflection of the light pulse.

Aircraft information, such as velocity, altitude, direction and/or speed may next be determined 350 in response to an aircraft controller. The information may be detected by a wind speed indicator, global positioning system (GPS), accelerometer, radar signal, or other aircraft sensor. The method may then use the aircraft directional information and the detected object distance from the laser emitter to estimate 360 if the aircraft is on path for a possible collision with the object. For example, if the emitter transmits a light pulse parallel and a known distance from a leading edge of the wing surface and if an object is detected closer than the length of the wing, a possible collision may occur. The method may then determine the speed and direction of the aircraft to determine if the aircraft is approaching the detected object. If the method determines a possible collision is not likely, the method returns to determining 310 if the anti-collision system is activated.

If the method determines 360 that a possible collision may occur, the method may then provide 370 an alert or warning to the aircraft crew indicative of the possible collision. The warning may be a visual and/or audible warning or may vary in intensity in response to the proximity of the object to the aircraft and/or calculated time to collision.

Figure 4:
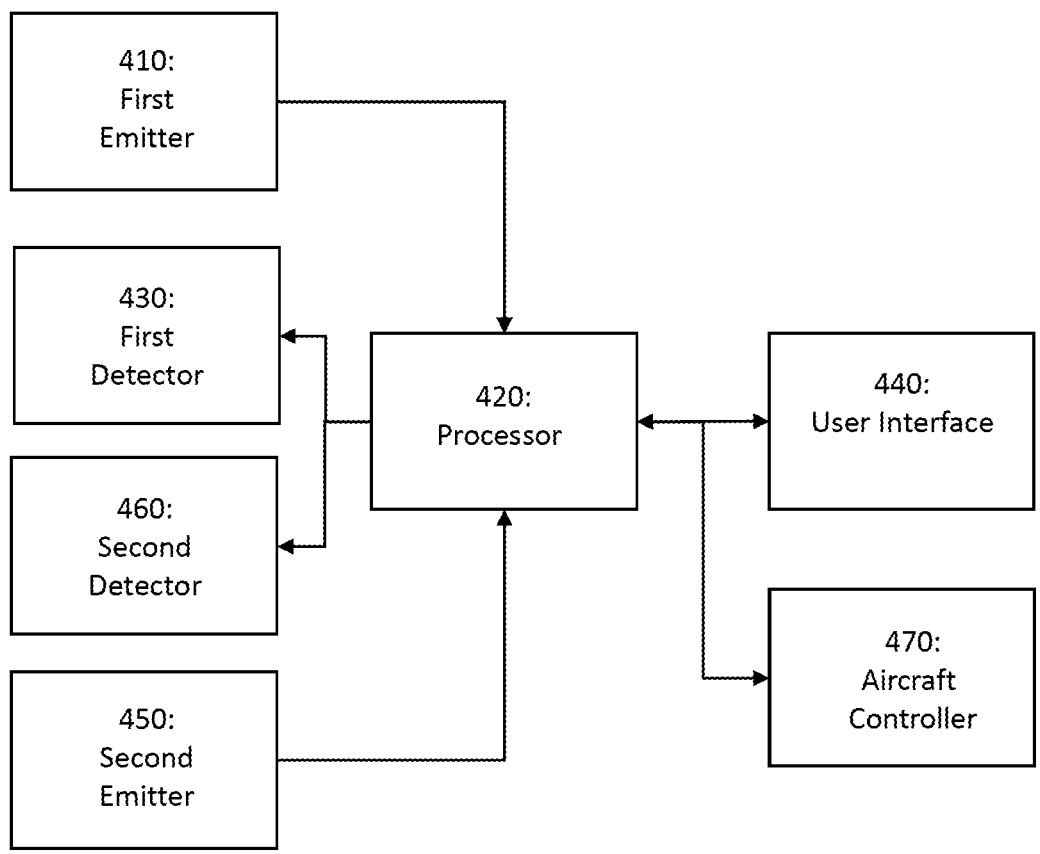
FIG. 4 is a simplified block diagram illustrating another non-limiting embodiment of a system for providing the aircraft collision warning system in accordance with the present disclosure.

Turning now to FIG. 4, a block diagram illustrating a system 400 for providing the aircraft collision warning system is shown. The exemplary system 400 may include a first light emitter 410, a first light detector 430, a processor 420, a user interface 440, a second light emitter 450 and a second light detector 460.

The exemplary system 400 may form a portion of an aircraft collision detection system within an aircraft for calculating possible collision or aircraft contact events and providing warnings to aircraft crew. The first light emitter 410 may be configured for transmitting a first light pulse at a first distance to a wing edge and providing a first time indicative of the transmitting of the light pulse. The first light pulse is transmitted in response to the aircraft taxiing or may be transmitted in response to an activation by a user on a user interface 440 such as a button, switch, or soft button on a touch screen display. In one exemplary embodiment, the first light emitter 410 may be mounted to an aircraft fuselage and wherein the first light pulse is transmitted parallel to the wing edge at a known distance from the wing edge. Thus, when an object is detected at a distance less than the length of the wing edge, if may be assumed that the object is within a path of the wing edge.

In an alternate embodiment, the first light emitter 410 may be capable of transmitting light pulses at different elevations or azimuths and wherein the first light emitter 410 may be configured to transmit a second light pulse at a second distance to the wing edge where the second distance is greater than the first distance and wherein the processor 420 may then be configured to detect a second object in response to the second light pulse and to generate a second control signal in response to the second object being within a path of the wing edge. The first light emitter 410 may then be configured to provide a transmission indicator of a transmitted light pulse to the processor 420 or the first light detector 430 such that a total propagation time, and then a distance to a detected object, may be determined.

The first light detector 430 is configured for detecting a reflection of the first light pulse and for providing a second time indicative of the detection of the reflection of the light pulse. The first light detector 430 may be collated with the first light emitter 410 or may be located separately with the field of view overlapping the field of view of the first light emitter 410. The first light detector 430 may be a photodiode, such as a silicon avalanche diode or a PIN diode. The first light detector 430 may include a second light detector 460 spaced at different locations in order to cover a field of view of the first light emitter 410. The first light detector 430 may be configured to provide a time of detection to the processor 420 or the like. Alternatively, the first light detector 430 may be configured to receive a transmission indicator of a transmitted light pulse from the first light emitter 410 and then detect the time of arrival of the reflection of the transmitted light pulse in order to provide a total propagation time or the like.

In this exemplary system 400, the processor 420 is operative to provide a warning to an aircraft crew in response to detection of an object within a wingspan of the aircraft and a calculation of a possible contact event occurring between the object and the aircraft wing. The processor 420 may be configured to receive the first time and the second time, to detect a first object in response to the first time and the second time and to generate a first control signal in response to a possible contact occurrence between the first object and the wing edge. The processor may determine an aircraft velocity in response to a global positioning system signal, or other aircraft data signal from an aircraft controller 470 or the like, and determine if a possible contact occurrence may occur in response to the aircraft velocity, the first time and the second time. The first control signal may be generated in response to the first object being within a path of the wing edge.

A user interface 440 may be used to provide the warning to the aircraft crew in response to the first control signal from the processor 420. The user interface may include one or more indicator lights, audible alerts, and/or digital displays for conveying alerts of differing severity to aircraft crew. Additionally, the alert may be provided to a tow vehicle operator via a wireless radio transmission or via visual or audible warning indicators located outside of the aircraft.

In an alternate embodiment, the aircraft collision detection system 400 within the aircraft may further include a second light emitter 450 configured to transmit a second light pulse at a second distance to the wing edge where the second distance may be greater than the first distance. The processor 420 may then detect a second object in response to the second light pulse and to generate a second control signal in response to the second object being within a path of the wing edge. In one exemplary embodiment, the first light pulse may be transmitted along a leading edge of an aircraft wing and the second light pulse is transmitted along a trailing edge of the aircraft wing. This exemplary configuration would provide protection for both the front edge and the rear edge of the wing. Alternatively, the light pulses may be transmitted parallel to a wing edge at different distances. This exemplary configuration would provide detection capabilities at two distances from the wing edge such that two levels of warning may be provided to aircraft crew.

In an alternate embodiment, the anti-collision system 400 for an aircraft may include a first light emitter 410, located on an aircraft fuselage, configured for transmitting a first light pulse at a first distance from a wing edge, a second light emitter 450, located on the aircraft fuselage, configured for transmitting a second light pulse at a second distance from the wing edge wherein the first distance is greater than the second distance. The system 400 may further include a light detector 430 configured for detecting a reflection of the first light pulse and a reflection of the second light pulse. A processor 420 may be configured to generate a first user alert in response to a propagation time of the first light pulse being indicative of a detection of a first object at the first distance to the wing edge and being within a path of the wing edge. The processor 420 may be further operative to generate a second user alert in response to a propagation time of the second light pulse being indicative of a detection of the first object at the second distance to the wing edge and being within the path of the wing edge. In this exemplary embodiment, the first user alert may be an optical alert and the second user alert may include the optical alert and an audible alert.

Figure 5:
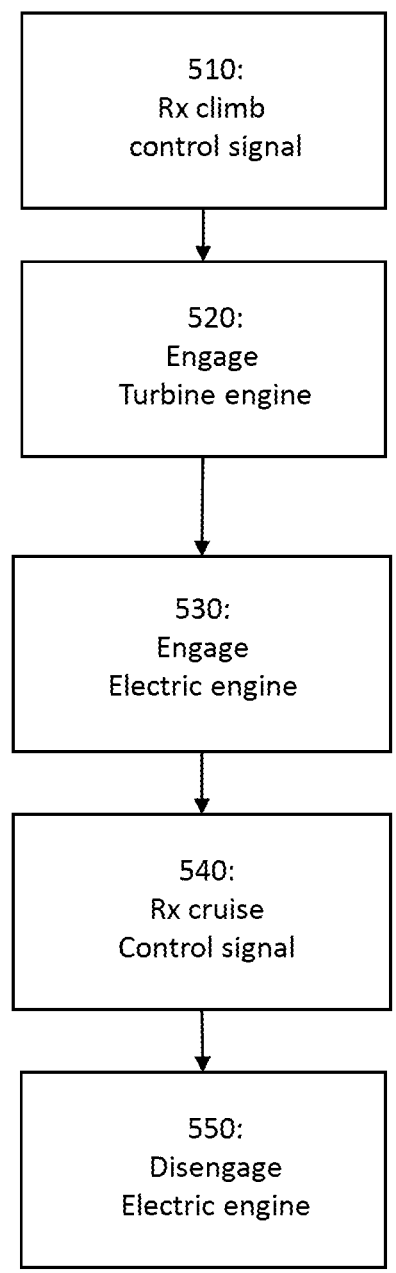
FIG. 5 shows a flow diagram illustrating another non-limiting embodiment of a method for implementing the aircraft collision warning system in accordance with the teachings of the present disclosure.

Turning now to FIG. 5, a flow diagram illustrating another non-limiting embodiment of a method 500 of providing an aircraft collision warning system in an aircraft is shown. In this exemplary configuration, the method is first configured for transmitting 510 a first light pulse proximate to a wing edge at a first time. The first light pulse may be transmitted parallel to the wing edge. In one exemplary embodiment, the first light pulse may be transmitted in response to the aircraft taxiing, and/or with landing gear deployed. The first light pulse may be transmitted by a first light emitter, such as a laser diode or the like. The first light emitter may be located on an aircraft fuselage or may be located on a wing or winglet of an aircraft wing. The first light emitter may be a fixed emitter for emitting the light pulse in a fixed direction. Alternatively, the light emitter may be a scanning light emitter for transmitting the light pulse in multiple directions, wherein each of the multiple directions is at a known azimuth and elevation.

The method is next operative for detecting 520 a reflection of the first light pulse at a second time. The detecting may be performed by a light detector, such as a photodiode or the like. The exemplary light emitter and the light detector may located on an aircraft fuselage and such that the first light pulse is transmitted parallel to the wing edge and the reflection is received substantially parallel to the wing edge.

A processor, such as a digital signal processor or microcontroller may be enabled to determining 530 a distance from a first object to the wing edge in response to the first time and the second time. The first time and the second time may be used to determine the total propagation time and the distance may then be determined in response to this total propagation time and the speed of light. In a first exemplary embodiment, the wing edge may be a leading wing edge and the first light pulse is transmitted in response to the aircraft velocity being a forward velocity. Alternatively, the wing edge is a trailing wing edge and wherein the first light pulse may be transmitted in response to the aircraft velocity being a rearward velocity.

The processor may then be configured for calculating 540 a possible contact occurrence in response to the distance and an aircraft velocity. The aircraft velocity is determined in response to data provided by a global positioning system or an aircraft controller. The velocity may include an aircraft speed, a direction, and may include steering information. For example, the processor may determine if the object is located within the wing span of the aircraft in response to the wing length, the distance to the object, and the speed and direction of travel of the aircraft.

The method is next operative for generating 550 a user alert in response to the calculation of the possible contact occurrence. In one exemplary embodiment, the processor may then be configured to generate a control signal to couple to a user interface to provide the user interface to activate the user alert. The alert may be provided to a user interface, such as a light, display or audible alarm for alerting the aircraft crew to the possible contact event. In one exemplary embodiment, the user alert may generated in response to the first object being within a path of the wing edge.

In an additional embodiment, the light emitter may be further configured to transmit a second light pulse proximate to the wing edge wherein the processor is further configured to locate a second object and to generate the user alert in response to the second object being within a path of the wing edge. The light emitter may be a scanning emitter capable to transmit light pulses at various elevation and azimuth angles to detect the presence of objects at different locations.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A collision detection system within an aircraft, the collision detection system comprising:
    a first light emitter adapted to be mounted to the aircraft, the first light emitter being configured for transmitting a first light pulse at a first distance to a wing edge and providing a first time indicative of the transmitting of the first light pulse, the first light emitter having a fixed position such that the first light pulse is transmitted at an elevation and an azimuth parallel to the wing edge;
    a first light detector, adapted to be mounted to the aircraft, the first light detector being configured to detect a reflection of the first light pulse and to provide a second time indicative of the detection of the reflection of the light pulse;
    a processor adapted to be mounted to the aircraft and configured to receive the first time and the second time, to determine a possible contact occurrence between a first object and the wing edge based, at least in part, on the first time and the second time, and to generate a first control signal in response to determining the possible contact occurrence; and
    a user interface, adapted to be mounted to the aircraft and configured to obtain the first control signal from the processor and to provide a user alert in response to the first control signal.

2. The collision detection system within the aircraft of claim 1, further including an aircraft flight controller adapted to be mounted on the aircraft and configured to provide an aircraft velocity and wherein the processor is further configured to obtain the aircraft velocity from the flight controller and to determine the possible contact occurrence is determined, based, in part, on the aircraft velocity.

3. The collision detection system of claim 1, wherein the first light pulse is transmitted parallel to a leading wing edge.

4. The collision detection system of claim 1, wherein the first light pulse is transmitted in response to the aircraft taxiing.

5. The collision detection system within an aircraft of claim 1 further including a second light emitter, adapted to be mounted to the aircraft and configured to transmit a second light pulse at a second distance to the wing edge, the second light emitter having a fixed position such that the second light pulse is transmitted at the elevation and the azimuth parallel to the wing edge and parallel to the first light pulse, wherein the second distance is greater than the first distance and wherein the processor is further configured to detect a second object in response to the second light pulse, to determine that the second object is in a path of the wing edge and to generate a second control signal in response to the second object being within the path of the wing edge.

6. The collision detection system of claim 5, wherein the first light pulse is transmitted along a leading edge of an aircraft wing and wherein the second light pulse is transmitted along a trailing edge of the aircraft wing.

7. The collision detection system of claim 1, wherein the first control signal is generated in response to the first object being within a path of the wing edge.

8. The collision detection system of claim 1, wherein the first light emitter and the first light detector are located on an aircraft fuselage and wherein the first light pulse is transmitted parallel to the wing edge.

9. The collision detection system of claim 1, wherein the first light emitter is further configured to transmit a second light pulse at a second distance to the wing edge where the second distance is greater than the first distance and wherein the processor is further configured to detect a second object in response to the second light pulse and to generate a second control signal in response to the second object being within a path of the wing edge.

10. A method comprising:
transmitting, by a light emitter, a first light pulse proximate to a wing edge at a first time the light emitter having a fixed position such that the first light pulse is transmitted at an elevation and an azimuth parallel to the wing edge;
detecting, by a light detector, a reflection of the first light pulse at a second time;
determining, by a processor, a distance from a first object to the wing edge in response to the first time and the second time;
calculating, by the processor, a possible contact occurrence in response to the distance and an aircraft velocity; and
controlling a user interface with the processor to generate a user alert in response to the possible contact occurrence.

11. The method of claim 10, wherein the aircraft velocity is determined in response to data provided by a global positioning system.

12. The method of claim 10, wherein the wing edge is a leading wing edge and wherein the first light pulse is transmitted in response to the aircraft velocity being a forward velocity and not transmitted in response to the aircraft having a rearward velocity.

13. The method of claim 10, wherein the wing edge is a trailing wing edge and wherein the first light pulse is transmitted in response to the aircraft velocity being a rearward velocity and not transmitted in response to the aircraft having a rearward velocity.

14. The method of claim 10, wherein the first light pulse is transmitted parallel to the wing edge.

15. The method of claim 10, wherein the first light pulse is transmitted in response to the aircraft taxiing.

16. The method of claim 10, wherein the light emitter and the light detector are located on an aircraft fuselage and wherein the first light pulse is transmitted parallel to the wing edge.

17. The method of claim 10, wherein the light emitter is further configured to transmit a second light pulse proximate to the wing edge wherein the processor is further configured to locate a second object and to generate the user alert in response to the second object being within a path of the wing edge.

18. The method of claim 10, wherein the user alert is generated in response to the first object being within a path of the wing edge.

19. An anti-collision system for an aircraft, comprising:
a first light emitter, located on an aircraft fuselage, configured for transmitting a first light pulse at a first distance from a wing edge, the first light emitter having a first fixed position such that the first light pulse is transmitted at an elevation and an azimuth parallel to the wing edge;
a second light emitter, located on the aircraft fuselage, configured for transmitting a second light pulse at a second distance from the wing edge wherein the first distance is greater than the second distance the second light emitter having a second fixed position such that the second light pulse is transmitted at an elevation and an azimuth parallel to the wing edge and the first light pulse;
a detector for detecting a reflection of the first light pulse and a reflection of the second light pulse; and
a processor configured to generate a first user alert in response to a propagation time of the first light pulse being indicative of a detection of a first object at the first distance to the wing edge and being within a path of the wing edge, the processor being further configured to generate a second user alert in response to a propagation time of the second light pulse being indicative of a detection of the first object at the second distance to the wing edge and being within the path of the wing edge.

20. The anti-collision system for an aircraft of claim 19 wherein the first user alert is an optical alert and the second user alert includes the optical alert and an audible alert.

* * * * *